March 29, 1966 O. L. DUNLAP 3,242,659
CHAIN TYPE GRASS CUTTER
Filed Oct. 28, 1963
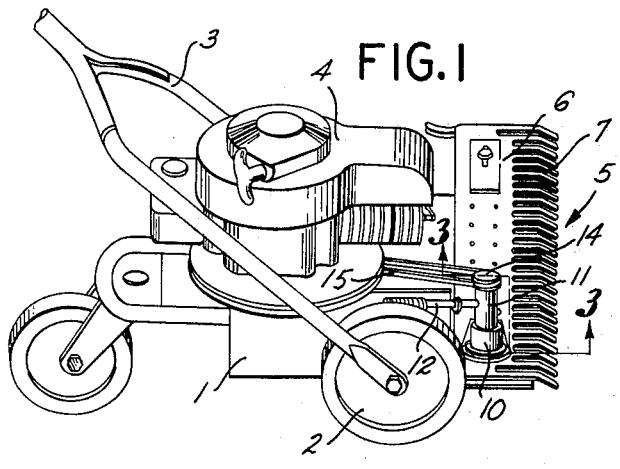
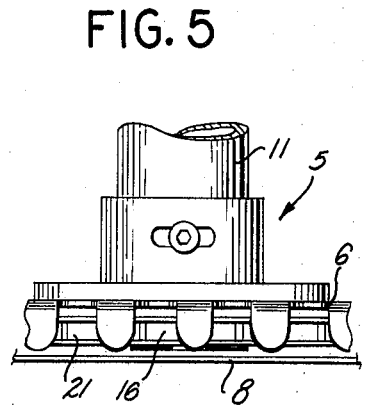
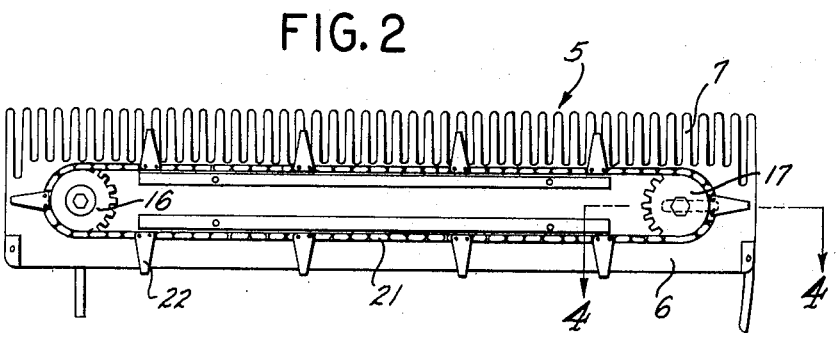
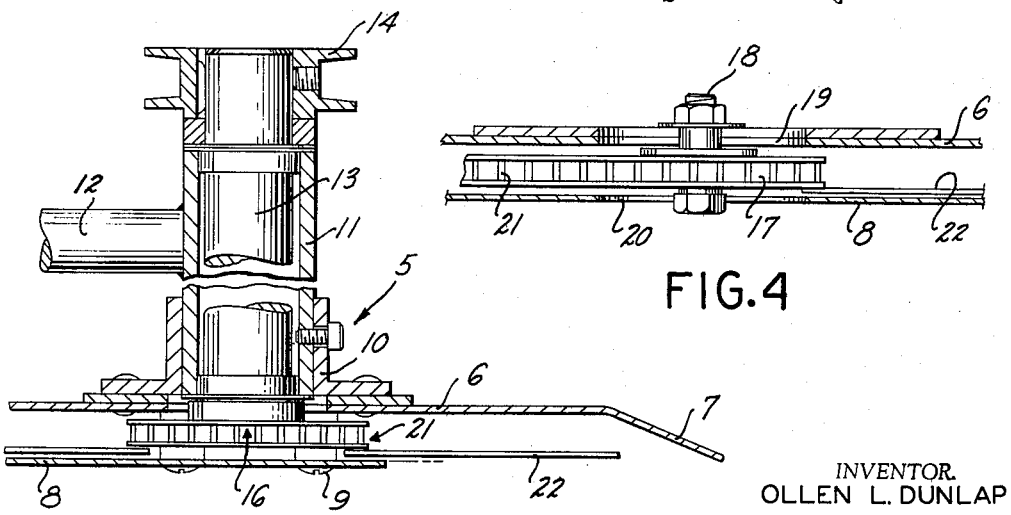
INVENTOR.
OLLEN L. DUNLAP
BY
ATTORNEY

United States Patent Office 3,242,659
Patented Mar. 29, 1966

3,242,659
CHAIN TYPE GRASS CUTTER
Ollen L. Dunlap, 4500 E. 7th St., Long Beach, Calif.
Filed Oct. 28, 1963, Ser. No. 319,270
1 Claim. (Cl. 56—25)

This invention relates to a certain type grass cutter which is intended primarily to cut grass or weeds, and may be either a mower for large commercial use or may relate to a lawn mower for smaller and simpler purposes.

An object of my invention is to provide a novel grass cutter in which the cutter blades are mounted on an endless chain, the chain being rotatably mounted in a mowing assembly and driven by an engine which is mounted on the mower or tractor.

Another object of my invention is to provide a novel grass cutter of the character stated, in which the cutting elements do not engage or move along the fixed combing fingers, which are part of the mowing assembly.

Another object of my invention is to so construct the grass cutter with spaced guard plates which are separated from the cutting elements so that there is less danger binding or breaking the cutter elements or the comb fingers by rocks or metal parts, which might be scattered on the ground.

Still another object of my invention is to provide a novel grass cutter of the character stated, which is simple in construction and relatively inexpensive to manufacture, and which is effective in operation.

Other objects, advantages and features of invention may appear from the accompanying drawing, the subjoined detailed description and the appended claim.

In the drawing:

FIGURE 1 is a perspective view of my chain type grass cutter.

FIGURE 2 is a bottom plan view of the mowing or grass cutting assembly with the bottom guard plate removed.

FIGURE 3 is a fragmentary sectional view taken on line 3—3 of FIGURE 1.

FIGURE 4 is a fragmentary sectional view taken on line 4—4 of FIGURE 2.

FIGURE 5 is a fragmentary side elevation of one end of the mowing assembly.

Referring more particularly to the drawing, the numeral 1 indicates a tractor frame of usual and well known construction, and which is commonly used in grass mowers presently on the market. The frame 1 is supported on a plurality of wheels 2 by means of which the power unit and the grass cutter can be moved about as necessary in mowing a lawn, grass, weeds, or the like. The frame 1 is guided manually by means of the handle 3 which is attached to the frame. An engine 4, of usual and well known construction, is mounted on the frame 1, and this engine operates the mowing unit 5, as will be subsequently described.

The mowing unit 5 consists of an upper rectangular plate 6 which extends horizontally and parallel to the ground, and is usually somewhat wider than the normal width of the frame 1. The top plate 6 is formed on its forward edge with a plurality of fingers 7 which define a comb, the outer ends of which are bent downwardly at an angle, and these fingers serve to comb the grass or weeds into an erect or vertical position so that it will be more effectively cut by the cutter elements, as will be subsequently described. A bottom guard plate 8 is mounted below the top plate 6 in spaced relation, and is fixedly mounted on the top plate 6 by means of suitable studs or bolts 9 which extend through these parts.

Adjacent one end of the top plate 6 there is mounted a boss 10, in which is fixedly mounted a tube 11, as best shown in FIGURE 3. A mounting rod 12 projects horizontally from the tube 11 and is fixedly attached to the tractor frame 1 for the purpose of mounting the mowing unit on the tractor or power unit, and there are also other mounting means on the mowing unit, all of which are well known in the art. A shaft 13 is journaled within the sleeve 11 and a pulley 14 on the upper end of this shaft is engaged and driven by the belt 15, which is driven by the engine 4. Thus the shaft 13 will be continuously rotated by the engine 4. A sprocket 16 is attached to the lower end of the shaft 13 and, consequently, rotates with this shaft. The sprocket 16 is spaced between the top plate 7 and the guard plate 8 and normally does not engage either of these elements. A second sprocket 17 is also mounted on the top plate 6 and is spaced between this top plate and the guard plate 8 and is freely rotatable between these elements. A spindle 18 extends vertically between the top plate 6 and guard plate 8 and the sprocket 17 is journaled on this spindle. For adjustment purposes, the top plate 6 is slotted as shown at 19, and the guard plate 8 is slotted as shown at 20, thus permitting the sprocket 17 to be adjusted horizontally, as might be required to compensate for wear. A chain 21 encircles the sprockets 16 and 17, and this chain is spaced from both the top plate 6 and the guard plate 8, so that it does not drag upon or engage either of these elements. A plurality of cutter fingers 22 are mounted on the chain 21 and these cutter fingers are also materially spaced from the top plate 6 and the guard plate 8 and do not drag upon either of these elements. The cutters 22 are preferably tapered towards their outer ends so that sticks, stones, and metal particles will tend to be thrown aside and will not bind or interfere with the movement of the cutters.

In operation:

The mowing unit 5, and especially the upper plate 6, is fixedly attached to the front edge of the frame 1 of the power unit or tractor. The mowing unit 5 is parallel to the ground and spaced somewhat above the ground level so that the fingers 7 will comb through the grass to hold the grass in an erect position. The engine 4 constantly rotates the chain 21 and the cutter fingers 22 continuously through the belt 15, which encircles the pulley 14. The fingers 7 are spaced above the cutter elements 22 and these parts do not slide against each other, but are spaced a substantial distance apart, so that small pebbles or metal particles will readily pass between them. The guard plate 8 is also spaced somewhat below the cutter fingers 22, and again this space is to prevent the wedging of gravel or metal particles between these parts. The chain 21 and the cutter fingers 22 travel at a high rate of speed and will readily cut off the grass or weeds at the proper level. If the chain 21 should stretch it can be tightened by adjusting the sprocket 17 along the slot 19, so that the chain will be taut at all times.

Having described my invention, I claim:

The combination of a power tractor including a frame, an engine mounted on the frame, and a chain type grass cutter comprising, an upper plate having integral comb fingers on the forward edge thereof, a guard plate spaced below the upper plate and extending parallel thereto, means detachably securing the guard plate to the upper plate, said guard plate extending over said chain and with the cutter fingers exposed, a pair of sprockets journaled on said upper plate and positioned between the upper and guard plates,
a chain encircling said sprockets,
a plurality of cutter fingers mounted on said chain and spaced from each other,
said cutter fingers being spaced vertically from both the upper plate and the guard plate,
means fixedly mounting the upper plate to said frame,
and drive means extending from the engine to one of said sprockets.

References Cited by the Examiner

UNITED STATES PATENTS

| | | | |
|---|---|---|---|
| 2,728,181 | 12/1955 | Carpenter | 56—25 |
| 2,782,582 | 2/1957 | McClearen | 56—25 |
| 3,006,126 | 10/1961 | Viverette | 56—25 |

ANTONIO F. GUIDA, *Acting Primary Examiner.*

RUSSEL R. KINSEY, *Examiner.*